(12) United States Patent
Minadeo et al.

(10) Patent No.: US 9,951,815 B2
(45) Date of Patent: Apr. 24, 2018

(54) PITCH BEARING ASSEMBLY WITH STIFFENER

(71) Applicant: General Electric Company, Schenectady, NY (US)

(72) Inventors: Adam Daniel Minadeo, Greenville, SC (US); William Francis Gevers, Simpsonville, SC (US); Robert Davis Pine, Greer, SC (US); Andreas Schubert, Ostercappeln (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1134 days.

(21) Appl. No.: 13/928,734

(22) Filed: Jun. 27, 2013

(65) Prior Publication Data
US 2015/0003986 A1    Jan. 1, 2015

(51) Int. Cl.
| | | |
|---|---|---|
| *F01D 25/16* | (2006.01) | |
| *F16C 33/60* | (2006.01) | |
| *F03D 1/06* | (2006.01) | |
| *F16C 33/58* | (2006.01) | |
| *F03D 80/70* | (2016.01) | |
| *F16C 35/04* | (2006.01) | |
| *F16C 19/18* | (2006.01) | |

(52) U.S. Cl.
CPC ............ *F16C 33/60* (2013.01); *F03D 1/0658* (2013.01); *F03D 80/70* (2016.05); *F16C 33/581* (2013.01); *F16C 35/042* (2013.01); *F05B 2260/79* (2013.01); *F16C 19/18* (2013.01); *F16C 35/045* (2013.01); *F16C 2300/14* (2013.01); *F16C 2360/31* (2013.01); *Y02E 10/721* (2013.01); *Y02E 10/722* (2013.01)

(58) Field of Classification Search
CPC .... F03D 11/0008; F03D 1/0658; F03D 1/001; F03D 1/0691; F03D 7/0224
USPC ....... 416/174, 147, 155, 156, 205, 207, 208, 416/209
See application file for complete search history.

(56) References Cited

U.S. PATENT DOCUMENTS

| | | | |
|---|---|---|---|
| 3,662,623 A * | 5/1972 | Lorence | .................. B66C 23/86 212/247 |
| 6,783,326 B2 | 8/2004 | Weitkamp et al. | |
| 6,942,461 B2 | 9/2005 | Wobben | |
| 8,047,792 B2 | 11/2011 | Bech et al. | |
| 8,297,929 B2 | 10/2012 | Steffensen | |
| 2008/0104821 A1 | 5/2008 | Erill et al. | |

(Continued)

FOREIGN PATENT DOCUMENTS

| | | | | |
|---|---|---|---|---|
| EP | 2 546 512 A1 | 1/2013 | | |
| WO | WO 2013076754 A1 * | 5/2013 | ........... | F03D 7/0224 |

OTHER PUBLICATIONS

Related U.S. Appl. No. 13/922,338, filed Jun. 20, 2013.

*Primary Examiner* — Jason Shanske
*Assistant Examiner* — Jason Mikus
(74) *Attorney, Agent, or Firm* — Dority & Manning, P.A.

(57) ABSTRACT

A pitch bearing assembly for a wind turbine may include an outer race and an inner race rotatable relative to the outer race. The inner race may define an inner circumference and may include a plurality of gear teeth around the inner circumference. The inner race may also include a circumferential flange extending at least partially around the inner circumference. In addition, the pitch bearing assembly may include a stiffener coupled to the circumferential flange.

13 Claims, 15 Drawing Sheets

(56) References Cited

U.S. PATENT DOCUMENTS

| | | |
|---|---|---|
| 2008/0191488 A1 | 8/2008 | Kirchner et al. |
| 2008/0199315 A1 | 8/2008 | Bech |
| 2008/0213095 A1 | 9/2008 | Bech et al. |
| 2009/0022442 A1 | 1/2009 | Bech et al. |
| 2009/0087127 A1* | 4/2009 | Larsen ................ F03D 7/0224 384/129 |
| 2010/0143136 A1* | 6/2010 | Daniels ............... F03D 7/0224 416/147 |
| 2011/0142645 A1 | 6/2011 | Nunez Polo et al. |
| 2011/0243738 A1* | 10/2011 | Andersen ............ F03D 1/0658 416/147 |
| 2012/0183703 A1 | 7/2012 | Beaulieu |
| 2012/0263598 A1 | 10/2012 | Thomsen et al. |
| 2012/0328443 A1* | 12/2012 | Yegro Segovia ..... F03D 1/0658 416/205 |
| 2013/0058784 A1* | 3/2013 | Sorensen ............. F03D 7/0224 416/1 |
| 2013/0136602 A1* | 5/2013 | Pasquet ............... F03D 1/0658 416/147 |

* cited by examiner

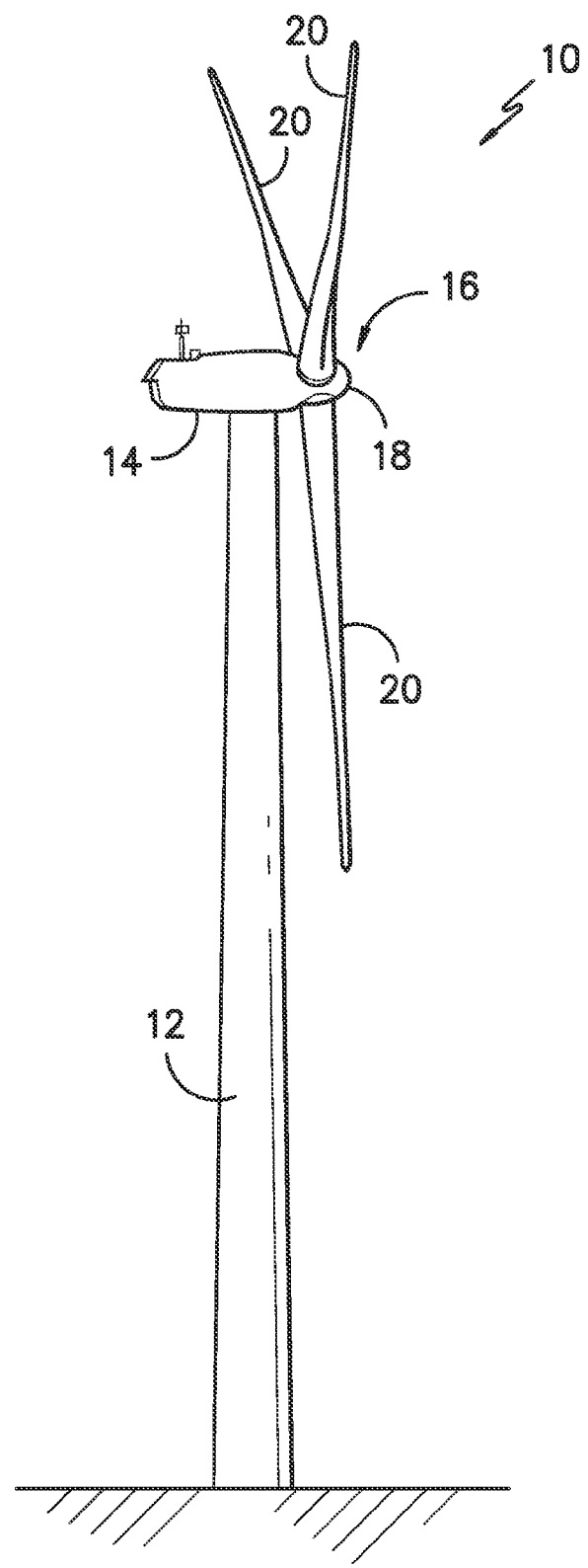
FIG. -1-

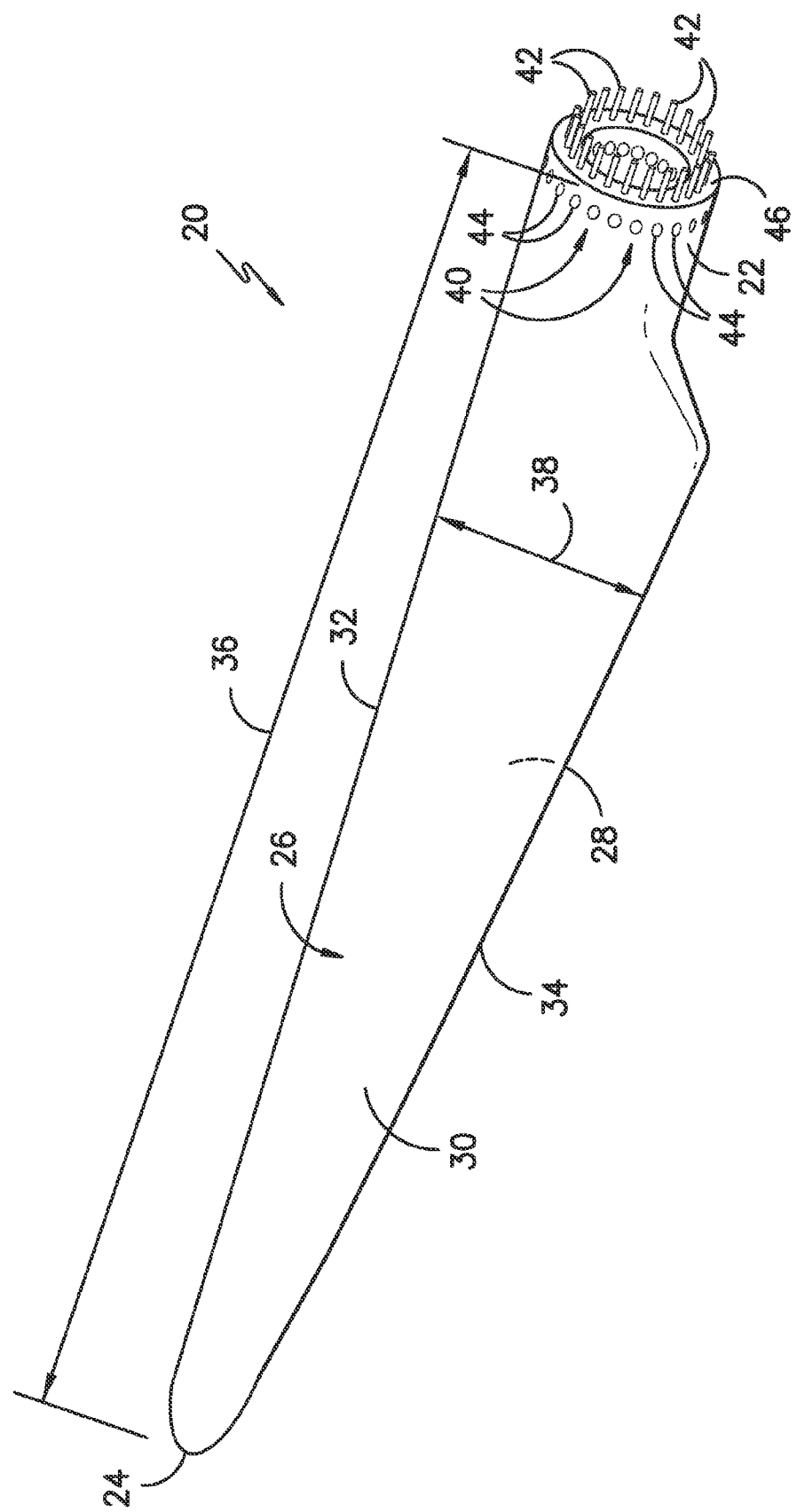
FIG. -2-

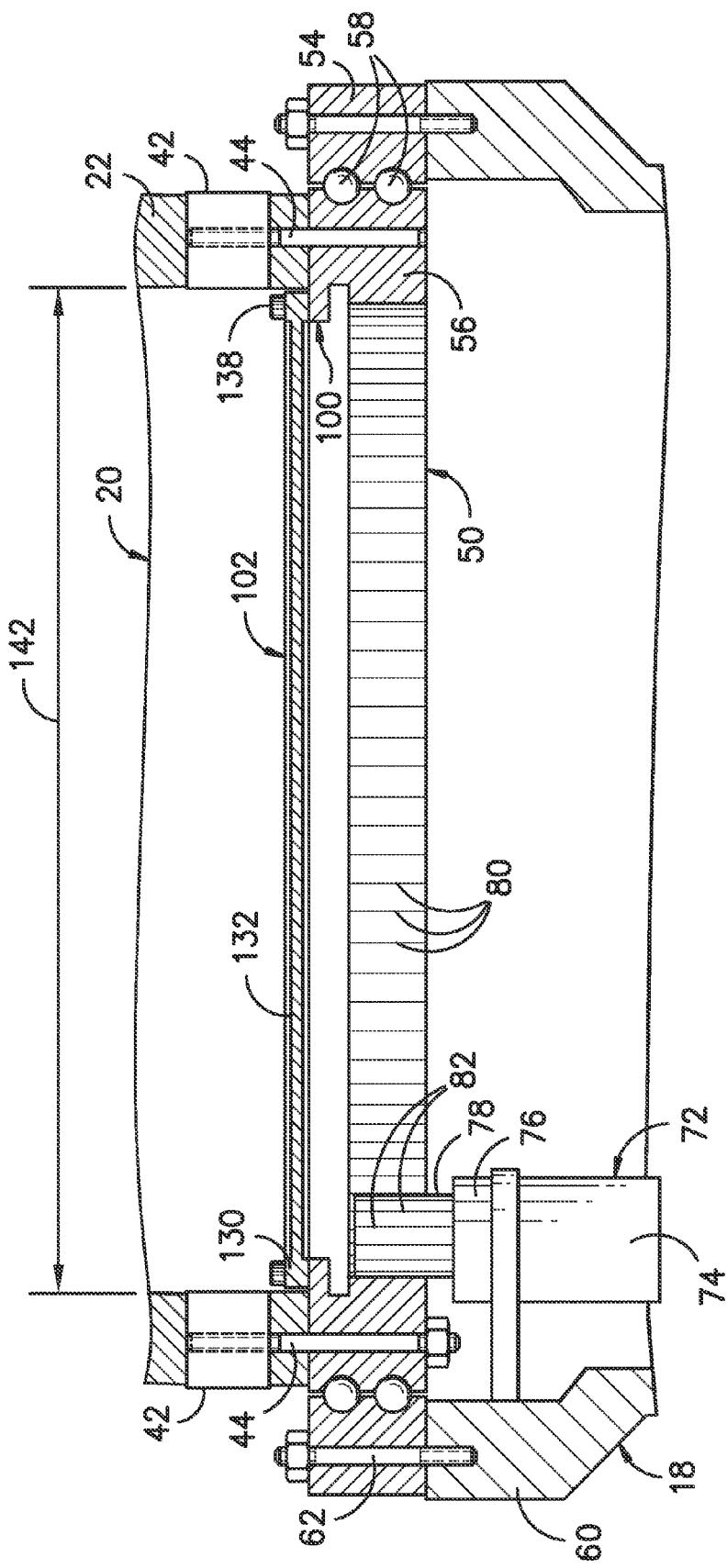
FIG. -3-

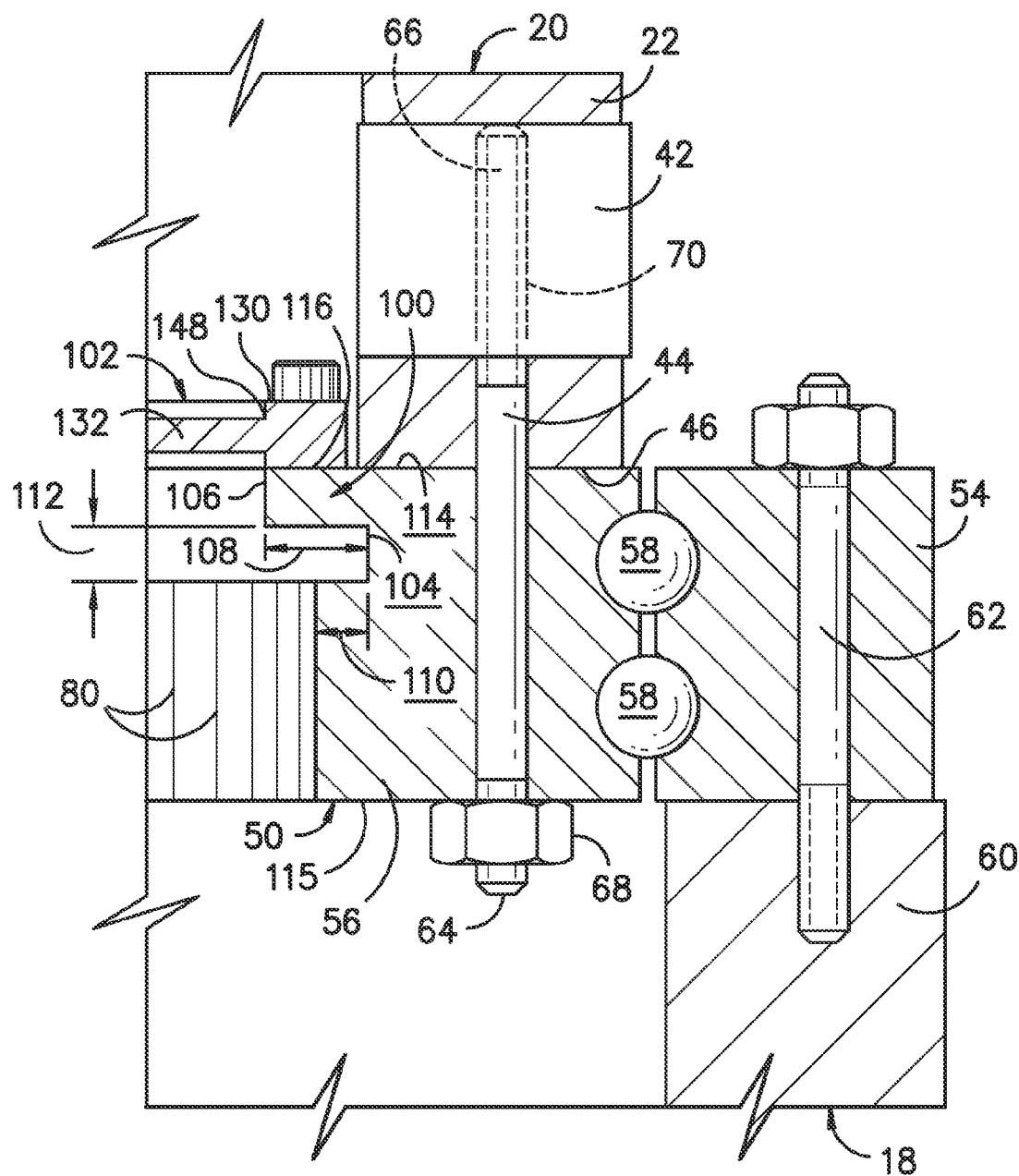
FIG. -4-

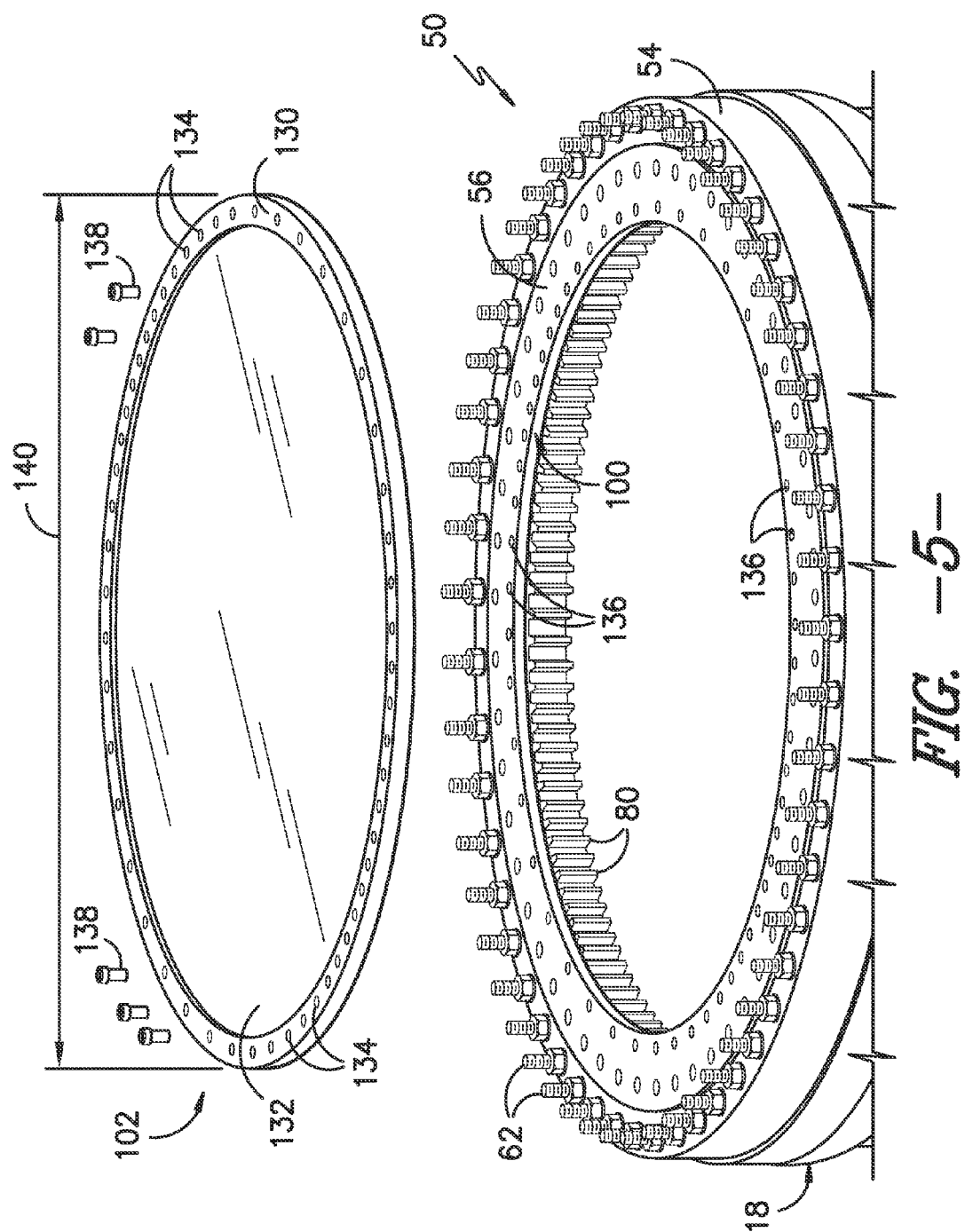
FIG. -5-

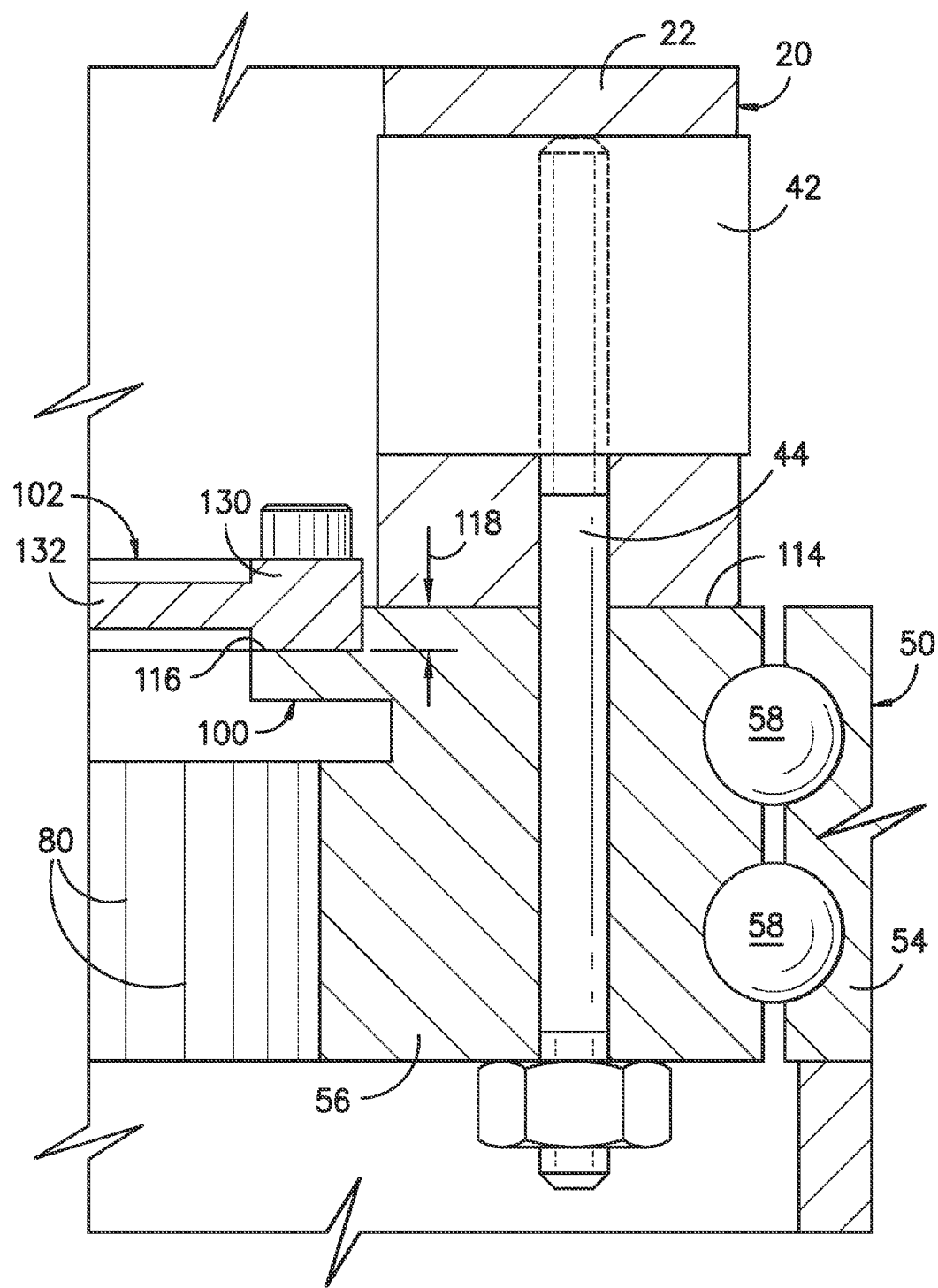
FIG. -6-

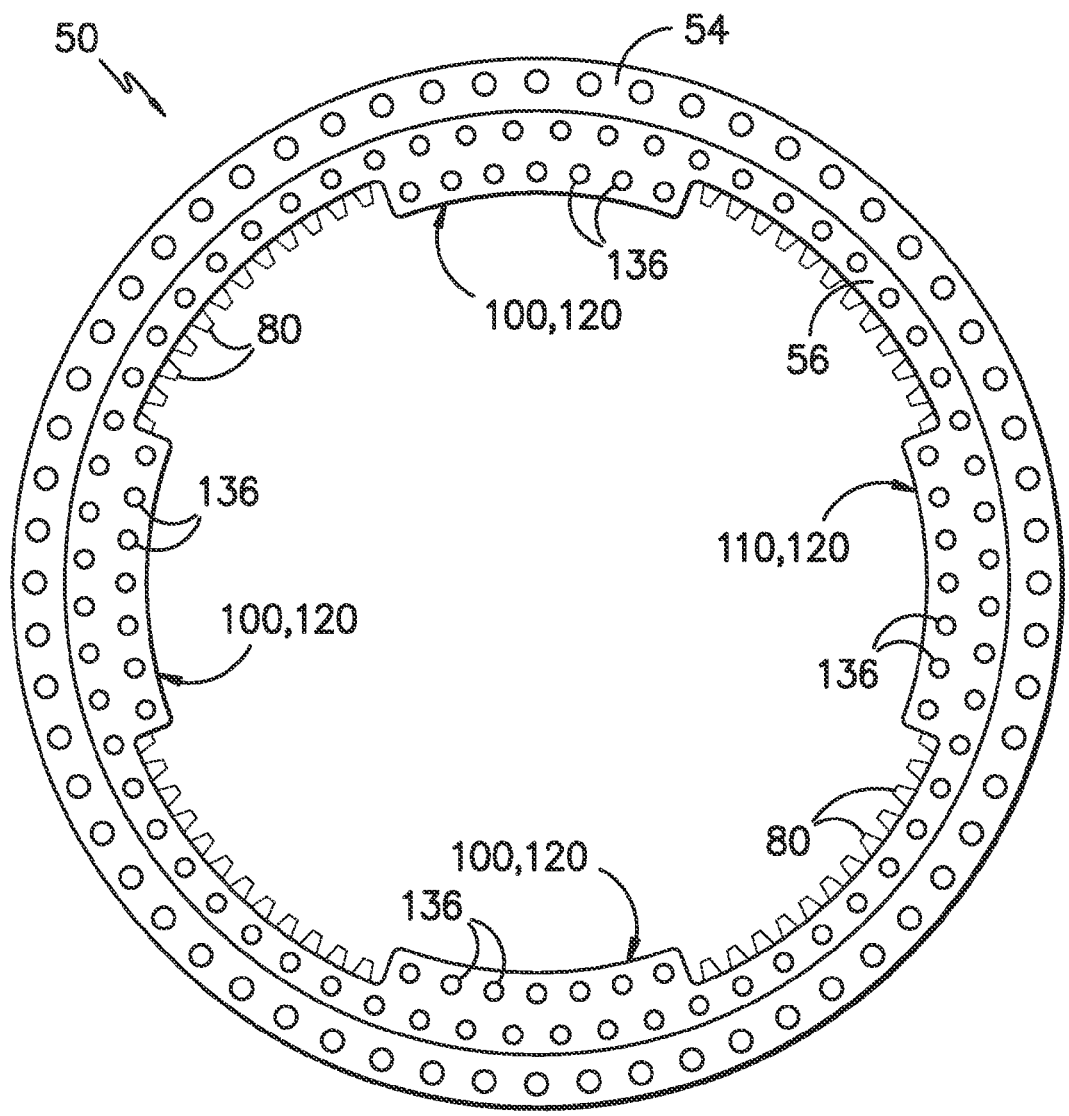
FIG. -7-

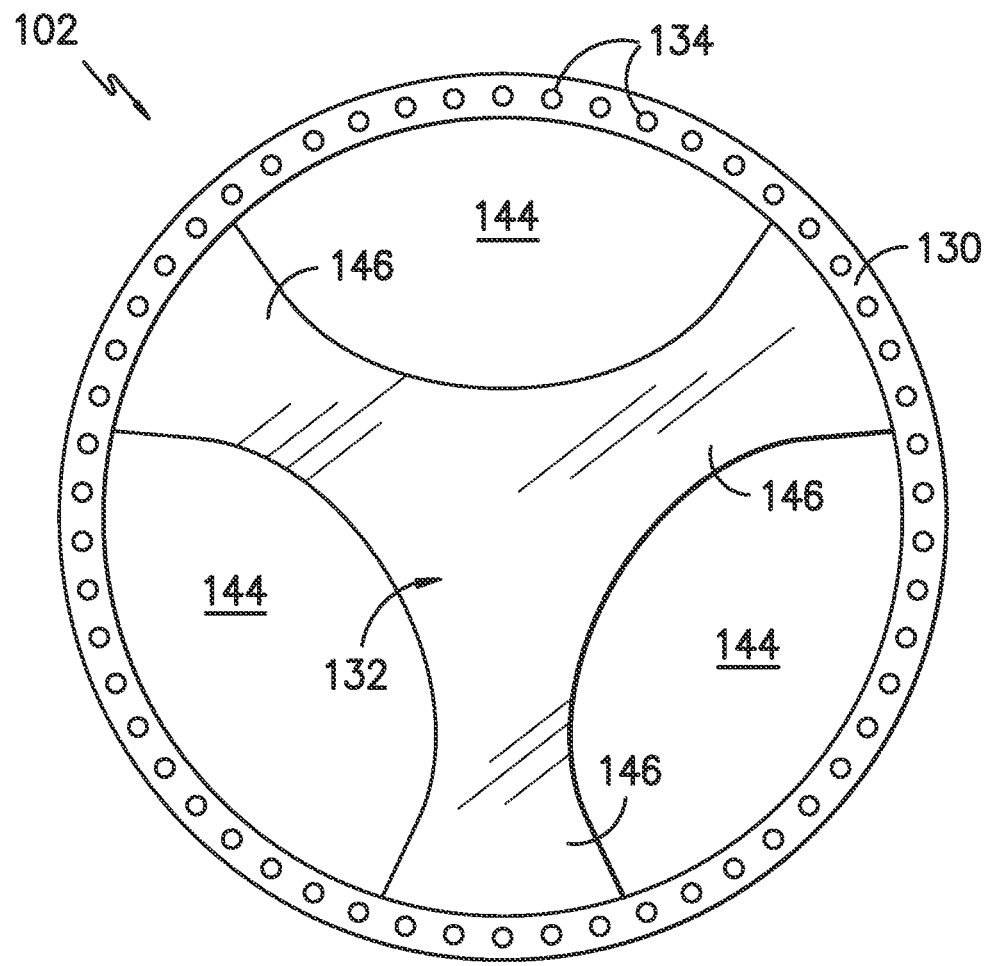
FIG. -8-

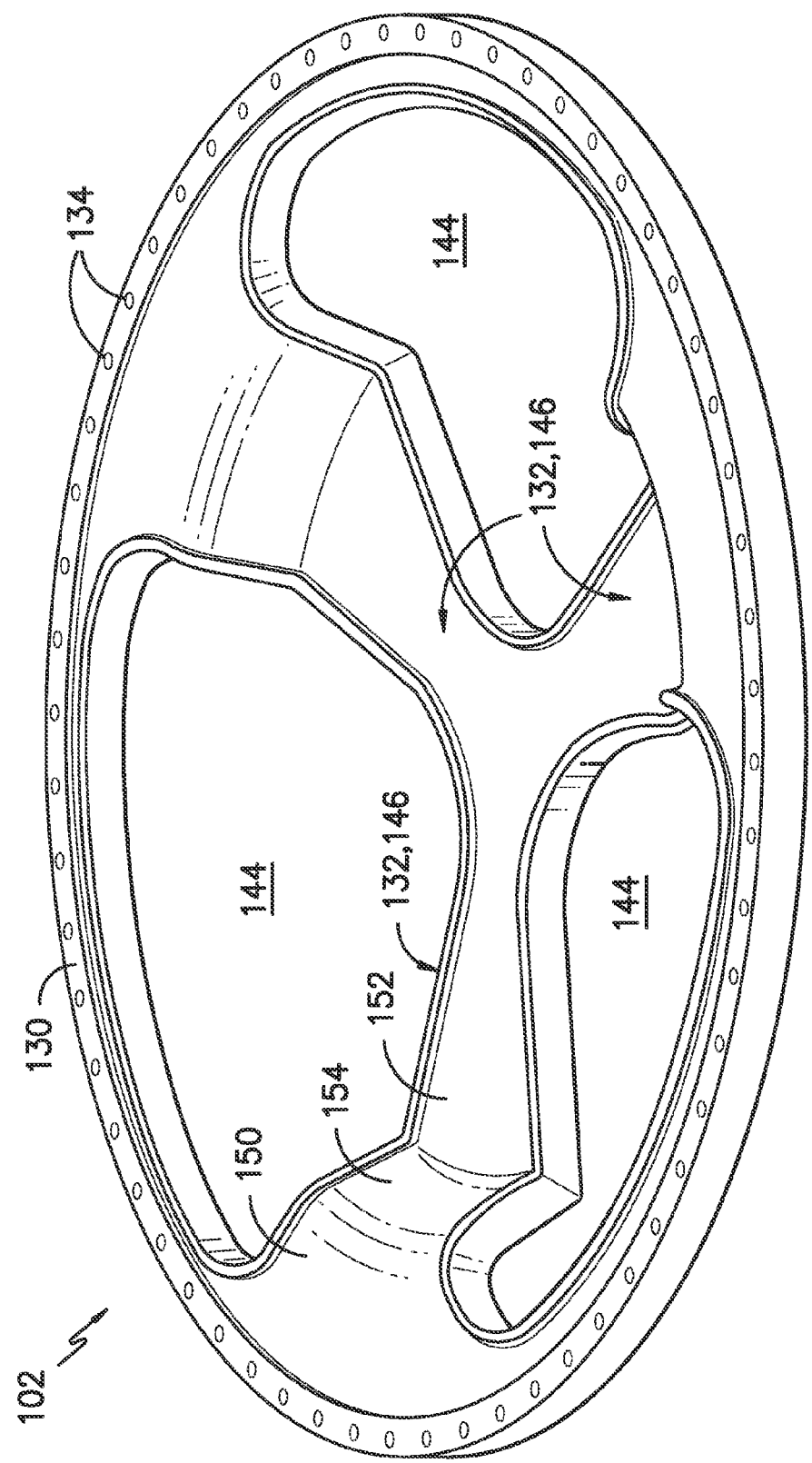

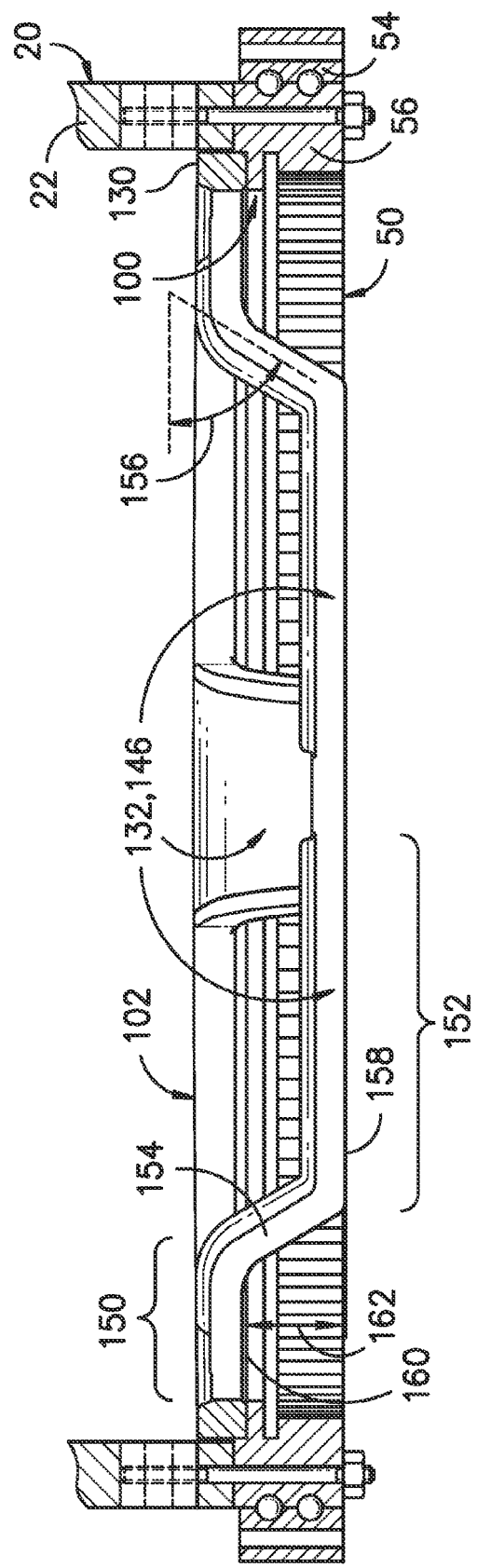
FIG. -10-

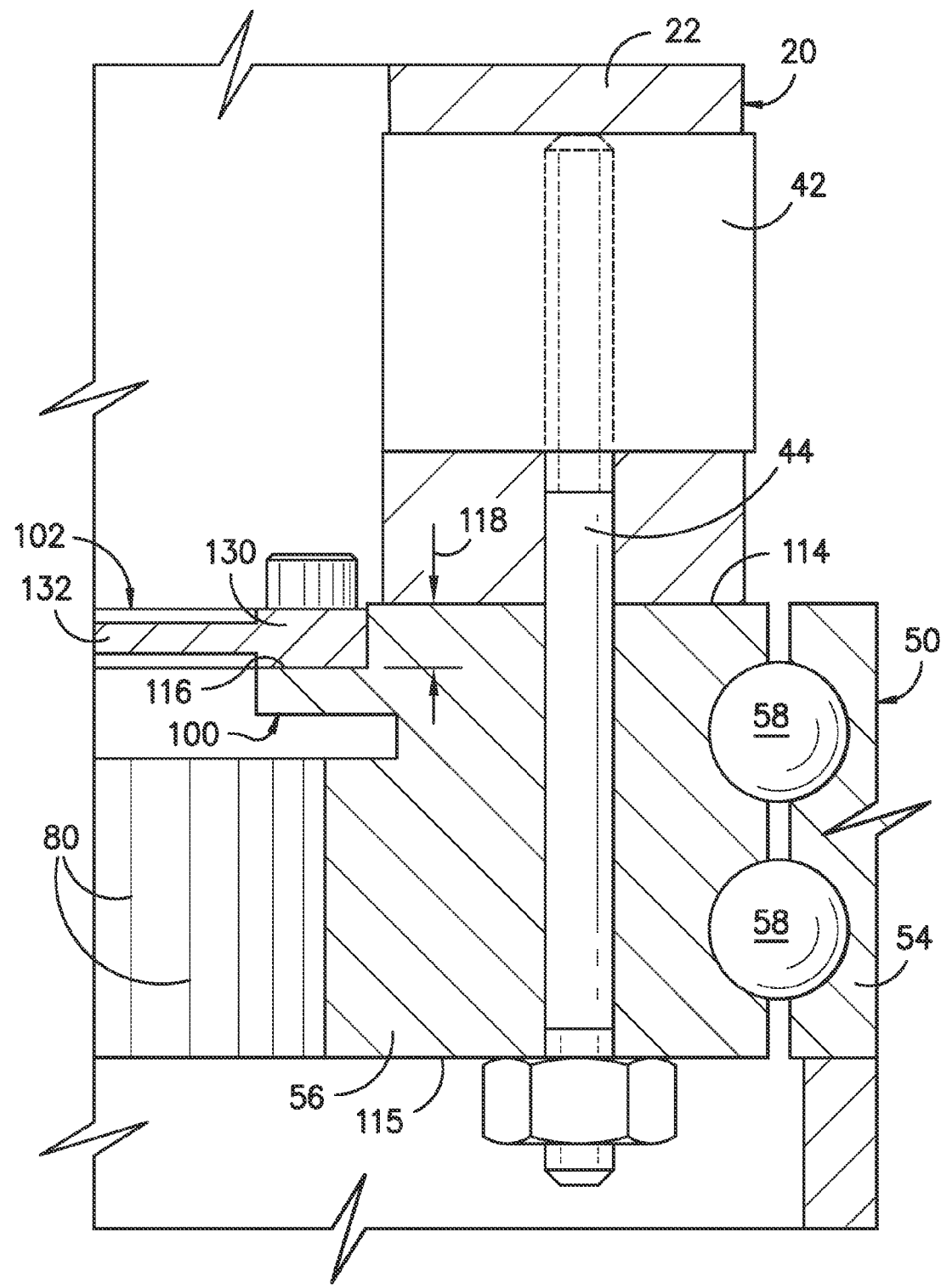
FIG. -11-

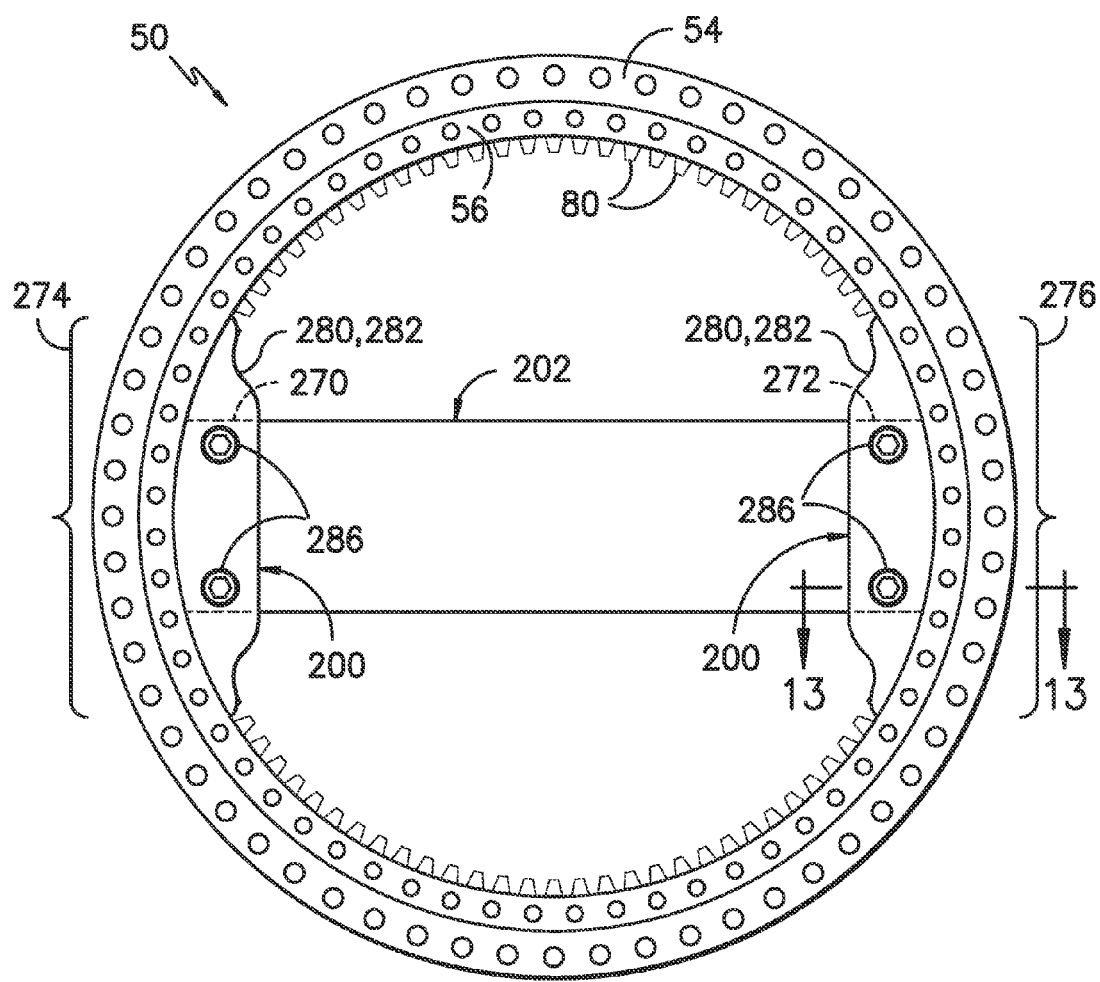
FIG. -12-

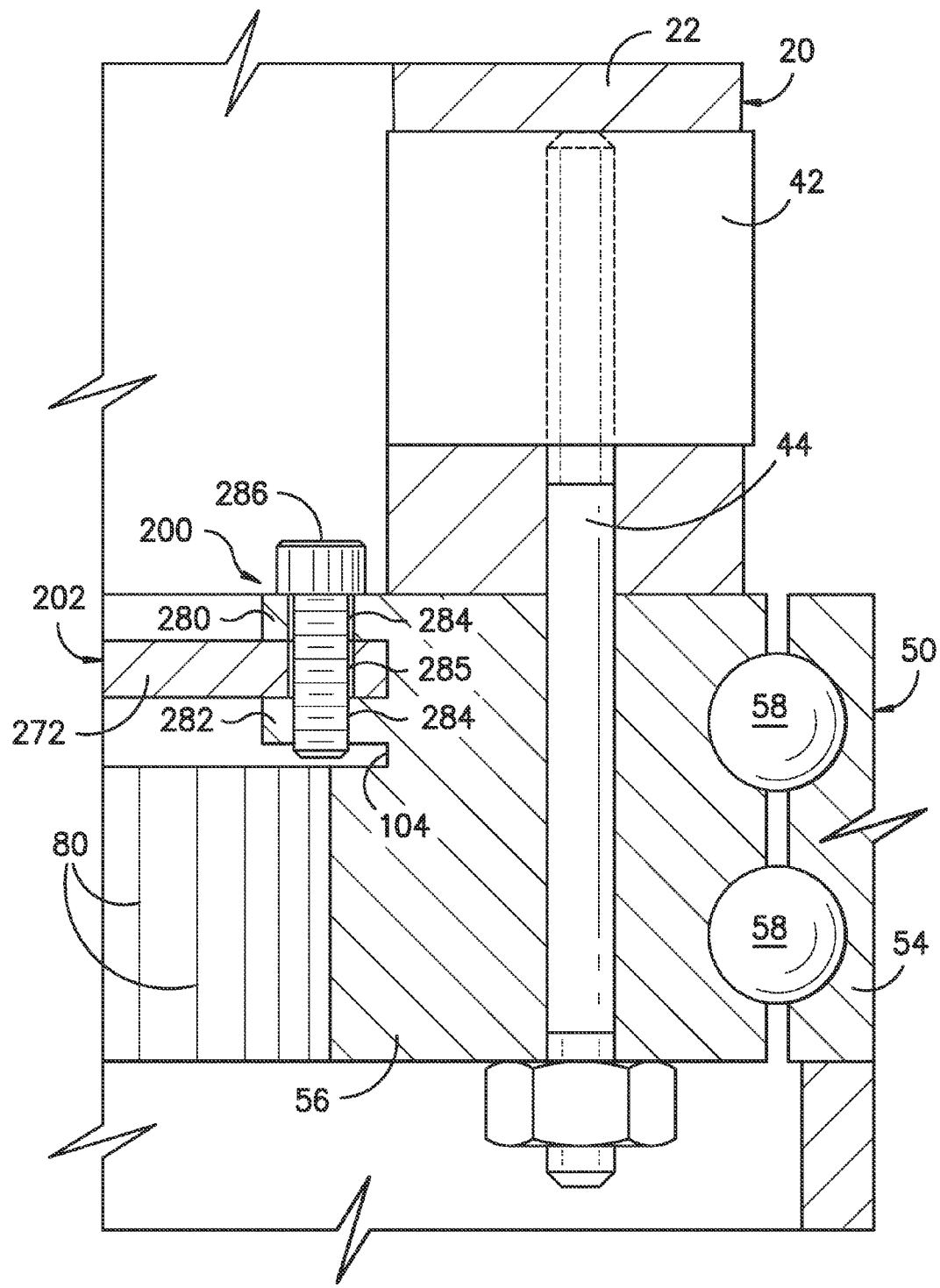
FIG. -13-

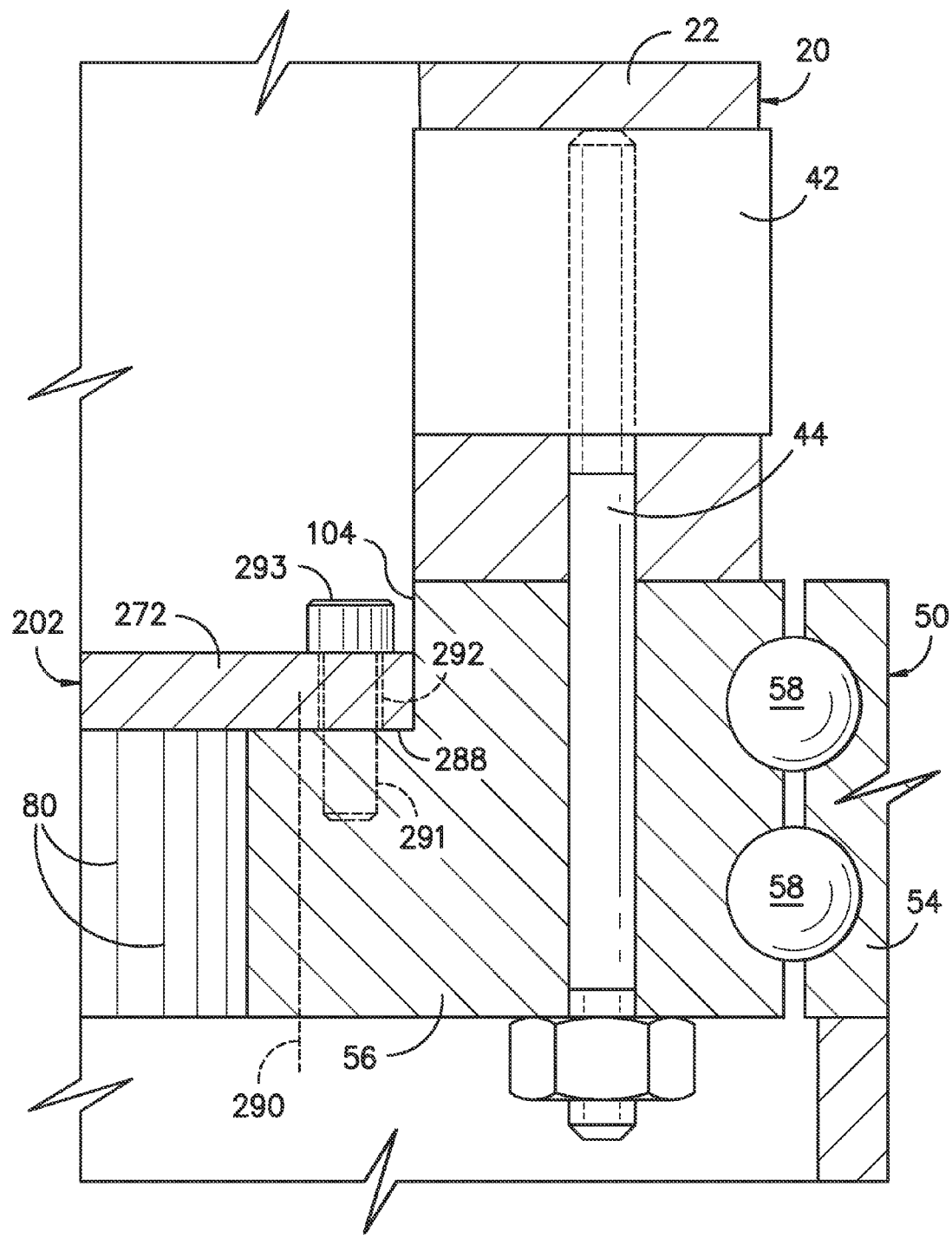
FIG. -14-

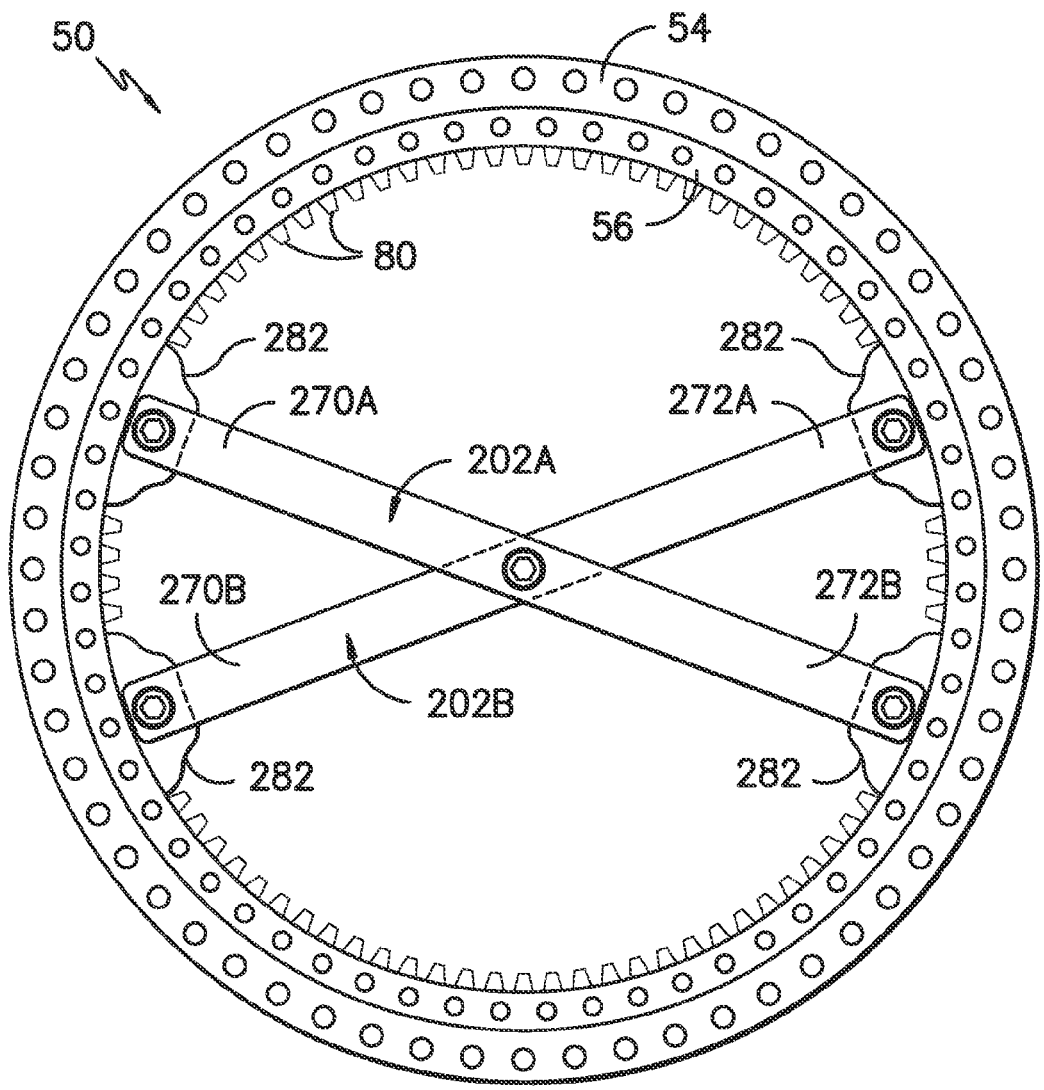
FIG. —15—

PITCH BEARING ASSEMBLY WITH STIFFENER

FIELD OF THE INVENTION

The present subject matter relates generally to wind turbines and, more particularly, to a pitch bearing assembly for a wind turbine having a circumferential flange for mounting a stiffener to the pitch bearing.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the stiffness differential between the hub and the rotor blades, the pitch bearings are often subjected to extreme, varying and/or opposing loads. For example, the inner race of each pitch bearing (i.e., the portion coupled to the rotor blades) may be subjected to varying, localized loads resulting from flapwise or edgewise bending of the rotor blades whereas the outer race of each pitch bearing (i.e., the portion coupled to the hub) may be subjected to lower and/or differing loads. This variation in loading across the inner and outer races can result in substantial damage to the pitch bearings.

Accordingly, a pitch bearing assembly having a stiffener configured to distribute loads and, thus, reduce the localized stress within the pitch bearing would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a pitch bearing assembly for a wind turbine. The pitch bearing assembly may include an outer race and an inner race rotatable relative to the outer race. The inner race may define an inner circumference and may include a plurality of gear teeth around the inner circumference. The inner race may also include a circumferential flange extending at least partially around the inner circumference. In addition, the pitch bearing assembly may include a stiffener coupled to the circumferential flange.

In another aspect, the present subject matter is directed to a pitch bearing assembly for a wind turbine. The pitch bearing assembly may include an outer race and an inner race rotatable relative to the outer race. The inner race may define an inner circumference and may include a plurality of gear teeth around the inner circumference. The inner race may also define a radial surface along the inner circumference that extends radially outwardly from the gear teeth. In addition, the pitch bearing assembly may include a stiffener coupled to the inner race along the radial surface at a location disposed radially outwardly relative to the gear teeth.

In a further aspect, the present subject matter is directed to a rotor blade assembly for a wind turbine. The rotor blade assembly may include a rotor blade having a body extending between a blade root and a blade tip. The rotor blade assembly may also include a pitch bearing coupled to the blade root. The pitch bearing may include an outer race and an inner race rotatable relative to the outer race. The inner race may define an inner circumference and may include a plurality of gear teeth around the inner circumference. The inner race may further include a circumferential flange extending at least partially around the inner circumference. In addition, the rotor blade assembly may include a stiffener coupled to the circumferential flange.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective view of one of the rotor blades of the wind turbine shown in FIG. 1;

FIG. 3 illustrates a cross-sectional view of one embodiment of a rotor blade coupled to a wind turbine hub via a pitch bearing in accordance with aspects of the present subject matter, particularly illustrating the pitch bearing having a circumferential flange configured to support a stiffener;

FIG. 4 illustrates a close-up, cross-sectional view of a portion of the rotor blade, wind turbine hub and pitch bearing shown in FIG. 3;

FIG. 5 illustrates a perspective view of the pitch bearing shown in FIG. 3, particularly illustrating the stiffener exploded away from the pitch bearing;

FIG. 6 illustrates another close-up, cross-sectional view of a portion of the rotor blade, wind turbine hub and pitch bearing shown in FIG. 3, particularly illustrating another embodiment of the pitch bearing having a circumferential flange that is offset from the top surface of the inner race of the bearing;

FIG. 7 illustrates a top view of another embodiment of the pitch bearing shown in FIG. 5, particularly illustrating the circumferential flange being formed from a plurality of flange segments;

FIG. 8 illustrates a top view of another embodiment of the stiffener shown in FIG. 5, particularly illustrating the stiffener including a plurality of web openings defined therein;

FIG. 9 illustrates a perspective view of a further embodiment of the stiffener shown in FIG. 5, particularly illustrating the stiffener defining a generally non-planar profile; and FIG. 10 illustrates a cross-sectional view of the stiffener shown in FIG. 9 coupled to the pitch bearing shown in FIG. 6;

FIG. 11 illustrates another close-up, cross-sectional view of a portion of the rotor blade, wind turbine hub and pitch bearing shown in FIG. 3, particularly illustrating an embodiment in which the circumferential flange is disposed entirely within the volume defined by the pitch bearing;

FIG. 12 illustrates a top view of another embodiment of a pitch bearing having a stiffener installed thereon;

FIG. 13 illustrates a partial, cross-sectional view of the pitch bearing and stiffener shown in FIG. 12 taken about line 13-13;

FIG. 14 illustrates another partial, cross-sectional view of the pitch bearing and stiffener shown in FIG. 12, particularly illustrating another configuration for coupling the stiffener to the pitch bearing; and FIG. 15 illustrates a top view of a further embodiment of a pitch bearing having two stiffeners installed thereon.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a pitch bearing assembly for a wind turbine that is configured to support a stiffener for stiffening the pitch bearing at the interface between the bearing and one of the rotor blades of the wind turbine. Specifically, in several embodiments, the pitching bearing may include a circumferential flange extending at least partially around the inner circumference of its inner bearing race. As such, a suitable stiffener may be coupled to the circumferential flange to increase the stiffness and rigidity of the inner race. By stiffening each pitch bearing at the interface between the bearing and its corresponding rotor blade, the loads transmitted through the rotor blade and into the pitch bearing may be evenly distributed, thereby decreasing the overall stress acting on the pitch bearing.

Referring now to the drawings, FIG. 1 illustrates a side view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Referring now to FIG. 2, a perspective view of one of the rotor blades 20 shown in FIG. 1 is illustrated in accordance with aspects of the present subject matter. As shown, the rotor blade 20 includes a blade root 22 configured for mounting the rotor blade 20 to the hub 18 of a wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via a pitch bearing 50 (FIG. 3)), as will be described in greater detail below.

Referring now to FIGS. 3-5, several views of a pitch bearing 50 suitable for mounting a rotor blade 20 to the hub 18 of a wind turbine 10 is illustrated in accordance with aspects of the present subject matter. Specifically, FIG. 3 illustrates a partial, cross-sectional view of the rotor blade 20 shown in FIG. 2 mounted onto the hub 18 via the pitch bearing 50. FIG. 4 illustrates a close-up, cross-sectional view of a portion of the rotor blade 20, hub 18 and pitch bearing 50 shown in FIG. 3. Additionally, FIG. 5 illustrates a perspective view of the pitch bearing shown in FIG. 3, particularly illustrating a pitch bearing stiffener 102 exploded away from the pitch bearing 50.

As shown, the pitch bearing 50 may include an outer bearing race 54, an inner bearing race 56, and a plurality of roller elements (e.g., balls 58) disposed between the outer and inner races 54, 56. The outer race 54 may generally be configured to be mounted to a hub flange 60 of the hub 18 using a plurality of hub bolts 62 and/or other suitable fastening mechanisms. Similarly, the inner race 56 may be configured to be mounted to the blade root 22 using the root bolts 44 of the root attachment assemblies 40. For example, as particularly shown in FIG. 4, each root bolt 44 may extend between a first end 64 and a second end 66. The first end 64 of each root bolt 44 may be configured to be coupled to a portion of the inner race 56, such as by coupling the first end 64 to the inner bearing race 56 using an attachment nut 68 and/or other suitable fastening mechanism. The second end 66 of each root bolt 44 may be configured to be coupled to the blade root 22 via the barrel nut 42 of each root attachment assembly 40. Specifically, as shown in FIG. 4, the second end 66 of each root bolt 44 may extend into and may be secured within an axially extending, threaded opening 70 defined through at least a portion of each barrel nut 42.

As is generally understood, the inner race 56 may be configured to be rotated relative to the outer race 54 (via the roller elements 58) to allow the pitch angle of each rotor blade 20 to be adjusted. As shown in FIG. 3, such relative rotation of the outer and inner races 54, 56 may be achieved using a pitch adjustment mechanism 72 mounted within a portion of the hub 18. In general, the pitch adjustment mechanism 72 may include any suitable components and may have any suitable configuration that allows the mechanism 72 to function as described herein. For example, as shown in the illustrated embodiment, the pitch adjustment mechanism 72 may include a pitch drive motor 74 (e.g., an electric motor), a pitch drive gearbox 76, and a pitch drive pinion 78. In such an embodiment, the pitch drive motor 74 may be coupled to the pitch drive gearbox 76 so that the motor 74 imparts mechanical force to the gearbox 76. Similarly, the gearbox 76 may be coupled to the pitch drive pinion 78 for rotation therewith. The pinion 78 may, in turn, be in rotational engagement with the inner race 56. For example, as shown in FIGS. 3 and 4, a plurality of gear teeth 80 may be formed along the inner circumference of the inner race 56, with the gear teeth 80 being configured to mesh with corresponding gear teeth 82 formed on the pinion 78. Thus, due to meshing of the gear teeth 80, 82, rotation of the pitch drive pinion 78 results in rotation of the inner race 56 relative to the outer race 54 and, thus, rotation of the rotor blade 20 relative to the hub 18.

Additionally, the pitch bearing 50 may include a circumferential flange 100 extending at least partially around the inner circumference of the inner race 56. As particularly shown in FIG. 4, in several embodiments, the circumferential flange 100 may be configured to extend radially inwardly relative to an inner surface 104 of the inner race 56 (i.e., the radially outermost surface 104 defined along the inner circumference of the inner race 56) such that a side surface 106 of the flange 100 is spaced apart from the inner surface 104 by a radial distance 108. This radial distance 108 may, in one embodiment, be greater than a radial distance 110 defined between the inner surface 104 and the radially innermost points of the gear teeth 80. However, in other embodiments, the radial distance 108 may be less than the radial distance 110 defined between the inner surface 104 and the innermost points of the gear teeth 80.

Moreover, in several embodiments, the circumferential flange 100 may be spaced apart axially from the gear teeth 80 of the inner race 56. For instance, as shown in FIG. 4, an axial distance 112 may be defined between the bottom surface of the circumferential flange 100 and the top surface of the gear teeth 80. However, in other embodiments, the circumferential flange 100 may be in contact with or otherwise disposed directly adjacent to the gear teeth 80 and/or the flange 100 may be formed integrally with the gear teeth 80.

Further, in several embodiments, the circumferential flange 100 may be aligned with a top surface 114 of the inner race 56. Specifically, as shown in FIG. 4, a top surface 116 of the flange 100 may be axially aligned or otherwise coplanar with the top surface 114 of the inner race 56. Alternatively, the flange 100 may be offset from the top surface 114 of the inner bearing race 56. For instance, FIG. 6 illustrates a partial, cross-sectional view of a variation of the embodiment of the pitch bearing 50 shown in FIG. 4. As shown in FIG. 6, the top surface 116 of the flange 100 is offset from the top surface 114 of the inner race 56 by an axial distance 118.

Additionally, as indicated above, the circumferential flange 100 may be configured to extend around at least a portion of the inner circumference of the inner race 56. For instance, as shown in FIG. 5, the circumferential flange may be ring-shaped and, thus, may extend around the entire inner circumference of the inner race 56. In other embodiments, the circumferential flange 100 may only be configured to extend partially around the inner circumference. For example, FIG. 7 illustrates a top view of a variation of the pitch bearing 50 shown in FIG. 5. As shown, the circumferential flange 100 is formed from a plurality of flange segments 120 spaced apart around the inner circumference of the inner race 56. In the illustrated embodiment, the circumferential flange 100 includes four flange segments 120 spaced apart equally around the inner circumference (e.g., 90 degree spacing). However, in alternative embodiments, the circumferential flange 100 may include any other number of flange segments 120, with such flange segments 120 having any suitable circumferential spacing around the inner circumference of the inner race 56.

Referring back to FIGS. 3-5, in several embodiments, a pitch bearing stiffener 102 may be configured to be supported by the circumferential flange 100. As shown, the stiffener 102 may generally include a ring-shaped mounting flange 130 and a stiffening web 132 extending within the mounting flange 130. In general, the mounting flange 130 may be configured to be coupled to the circumferential flange using any suitable attachment means/method known in the art. For example, as shown in FIG. 5, the mounting flange 130 may define a plurality of axially oriented stiffener openings 134. The stiffener openings 134 may generally be configured to be aligned with corresponding flange openings 136 defined in the circumferential flange 100. As such, when the stiffener 102 is positioned onto the flange 100, suitable fasteners 138 (e.g., bolts, retaining pins, etc.) may be inserted through the aligned openings 134, 136 to allow the stiffener 102 to be coupled to the flange 100. Alternatively, the stiffener 120 may be configured to be coupled to the circumferential flange 100 using any other suitable attachment means/method known in the art. For instance, the stiffener 102 may be welded to the circumferential flange 100 or secured to flange 100 using suitable adhesives.

It should be appreciated that, as shown in the illustrated embodiment, the circumferential flange 100 is defined along the inner circumference of the inner race 56 on the blade side of the pitch bearing 50. As such, depending on the thickness of the stiffener 102 and/or the positioning of the circumferential flange 100 relative to the top surface 114 of the inner race 56, the stiffener 102 may be configured to extend axially at least partially within the interior of the blade root 22 of the rotor blade 20. For example, in the embodiment shown in FIG. 4, the entire stiffener 100 is positioned within the rotor blade 20 (i.e., by being disposed outboard of the plane defined at the root end 46 of the blade 20). Alternatively, in the embodiment shown in FIG. 6, only a portion of the stiffener 102 extends axially within the interior of the rotor blade 20. Regardless, in such embodiments, an outer diameter 140 (FIG. 5) of the mounting flange 130 may be configured to be dimensionally smaller than an inner diameter 142 (FIG. 3) of the blade root 22 such that at least a portion of the stiffener 102 may be received within the interior of the rotor blade 22. However, it should be appreciated that, in alternative embodiments, the stiffener 102 may be positioned entirely within the volume defined by the inner circumference of the inner race 56 (e.g., the volume included between the planes defined by the top surface 114 and a bottom surface 115 (FIG. 3) of the inner race 56). For instance, FIG. 11 illustrates an embodiment of the pitch bearing 50 and the stiffener 102 in which the circumferential flange 100 is offset from the top surface 114 of the inner race 56 by a sufficient distance 118 such that, together with the thickness of the stiffener 102, the stiffener 102 is positioned entirely within the volume defined by the inner circumference of the inner race 56.

In general, the stiffening web 132 of the stiffener 102 may have any suitable configuration that allows the stiffener 102 to provide additional stiffness and/or rigidity to the inner race 56, thereby stiffening the pitch bearing 50 at and/or adjacent to the blade/bearing interface. For instance, in several embodiments, the stiffening web 132 may be configured to extend radially inwardly from the mounting flange 130 such that the stiffener 102 has a disk-like configuration defining a generally flat or planar profile. In such embodiments, the stiffening web 132 may be configured to define a solid cross-sectional profile within the mounting flange 130. For example, as shown in FIG. 5, the stiffening web 102 is completely solid and, thus, fills-in the radial, interior space defined by the mounting flange 130.

Alternatively, the stiffener web 132 may include one or more web openings 144 defined therethrough. For example, in the alternative configuration of FIG. 8, a plurality of web openings 144 are defined in the stiffening web 132 such that the web 142 defines a non-solid cross-sectional profile within the mounting flange 130. Specifically, as shown in the illustrated embodiment, the stiffening web 132 is formed from three stiffening arms 146 extending radially inwardly from the mounting flange 130 so as to be connected integrally at the center of the stiffener 102, with the arms 146 being spaced apart from one another so that three separate openings 144 are defined within the stiffener 102. In other embodiments, it should be appreciated that the stiffening web 132 may include any other suitable number of stiffening arms 146 and/or web openings 144. For instance, the stiffening web 132 may only include two stiffening arms 146 extending radially inwardly from the mounting flange 130 towards the center of the stiffener 102 such that two web openings 146 are defined in the stiffener 102 or the stiffening web may 132 include four stiffening arms 146 spaced apart from one another such that the four web openings 144 are defined in the stiffener 102. Alternatively, the stiffening web 132 may be configured to extend radially inwardly from the mounting flange 140 such that a single web opening 144 is defined in the stiffener 102 (e.g., at the center of the stiffener 102 or at any other suitable location).

It should be appreciated that, although the mounting flange 130 is shown in the illustrated embodiment as having a greater thickness than the stiffening web 132 (e.g., as indicated by a step-down 148 (FIG. 4) in thickness at the flange/web interface), the mounting flange 130 and stiffening web 132 may, in one embodiment, have the same thickness. In such an embodiment, the mounting flange 140 may simply correspond to the portion of the stiffener 102 that is configured to be coupled to the circumferential flange 100 (e.g., the portion of the stiffener 102 within which the stiffener openings 134 are defined).

As an alternative to a disk-shaped, planar configuration, the stiffener 102 may have any other suitable configuration that permits it to function as described herein. For instance, FIGS. 9 and 10 illustrate one embodiment of an alternative configuration for the stiffener 102. As shown, instead of defining a planar profile, the stiffening web 132 defines a non-planar profile as it extends radially inwardly from the mounting flange 130. Specifically, the stiffening web 132 includes a plurality stiffening arms 146, with each arm 146 including a first radially extending portion 150 and a second radially extending portion 152 spaced axially apart from the first radially extending portion 150. For example, as particularly shown in FIG. 10, each arm 144 may include a stepped or angled portion 154 that extends at an angle 156 (e.g., relative to the plane defined by the mounting flange 130) between the first and radially extending portions 150, 152. Thus, a bottom surface 158 of the second radially extending portion 152 may be spaced apart axially from a bottom surface 160 of the first radially extending portion 150 by an axial distance 162. It should be appreciated that such an embodiment may be desirable to provide space within the interior of the pitch bearing 50 for additional wind turbine components, such as a battery box.

Referring now to FIGS. 12 and 13, another embodiment of a stiffener 202 is illustrated in accordance with aspects of the present subject matter. As shown, instead of the ring-shaped stiffener 102 described above, the stiffener 202 comprises a plate-like structural member configured to extend across the interior of the pitch bearing 50. Specifically, in the illustrated embodiment, the stiffener 202 defines a generally rectangular shape extending between a first end 270 coupled to the inner race at a first location 274 defined along the inner circumference of the inner race 56 and a second end 272 coupled to the inner race 56 at a second, opposed location 276 defined along the inner circumference. In other embodiments, the stiffener 202 may be configured to define any other suitable shape.

In general, the stiffener 202 may be configured to be coupled to the inner race 56 using any suitable means. For example, the stiffener 202 may be configured to be coupled to the inner race 56 via one or more circumferential flanges 200 disposed at each end 270, 272 of the stiffener 200, such as by configuring each circumferential flange 200 similar to the flange segments 120 described above with reference to FIG. 7. Specifically, in several embodiments, each circumferential flange 200 may include a single flange segment (such as that shown in FIG. 7) or multiple flange segments disposed at each end 270, 272 of the stiffener 200. For example, as shown in FIG. 12, each circumferential flange 200 may include a top flange segment 280 and a bottom flange segment 282 extending radially inwardly relative to the inner surface 104 of the inner race 56. In such embodiments, each flange segment 280, 282 may define one or more axially extending openings 284 configured to be aligned with one or more corresponding openings 285 defined through each end 270, 272 of the stiffener 200. As such, a suitable fastener 286 may be inserted through each set of aligned openings 284, 285 to secure the stiffener 200 to the flange segments 280, 282.

It should be appreciated that, in one embodiment, each flange segment 280, 282 may be formed integrally with the inner race 56 so that the inner race 56 and the flange segments 280, 282 together comprise a single component. Alternatively, the flange segments 280, 282 may be configured to be separately coupled to the inner race 56, such as by welding the flange segments 280, 282 to the inner race 56 or by securing the flange segments 280, 282 to the inner race 56 using mechanical fasteners.

Additionally, it should be appreciated that, in several embodiments, the openings 284, 285 defined through the flange segments 280, 282 and through each end 270, 272 of the stiffener 202 may be formed with tight tolerances relative to the outer diameter of the fastener 286. As such, when the fasteners 286 are inserted through the aligned openings 284, 285, any relative movement between the stiffener 202 and the fasteners 286 may be minimized It should also be appreciated that, as an alternative to coupling the stiffener 202 to the flange segments 280, 282, the stiffener 202 may be coupled to the inner race 56 at any other suitable location and/or via any other suitable component(s). For example, FIG. 14 illustrates a partial, cross-sectional view of the stiffener 202 shown in FIG. 12 coupled to the pitch bearing 50 at a different location. As shown, the inner race 56 is configured such that a radial surface 288 of the inner race 56 extends radially outwardly relative to the radially outermost locations of the gear teeth 80 (indicated by line 290), such as the valleys defined between the gear teeth 80. In such an embodiment, the stiffener 202 may be coupled to the inner race 56 along the radial surface 288 at a location disposed radially outwardly from the gear teeth 80. For instance, as shown in FIG. 14, one or more openings 291 may be formed in the inner race 56 along the radial surface 288 that are configured to be aligned with one or more corresponding openings 292 defined in the stiffener 202. Suitable fasteners 293 may then be utilized to couple the stiffener 202 to the inner race 56.

Moreover, it should be appreciated that, as an alternative to having a single stiffener 202 extending across the interior of the pitch bearing 50, two or more stiffeners may be coupled to the inner race 56 so as to extend across the interior of the pitch bearing 50. For example, as shown in FIG. 15, the pitch bearing 50 includes a first stiffener 202A and a second stiffener 202B, with each stiffener 202A, 202B including a first end 270A, 270B and a second end 272A, 272B coupled to the inner race 56. In such an embodiment, the ends 270A, 270B, 272A, 272B of the stiffeners 202A, 202B may be configured to be coupled to the inner race 56 using any suitable means, such as by coupling the stiffeners 200A, 200B to the inner race 56 using one or more flange segments (such as the bottom flange segment 282 shown in FIG. 15), by securing the stiffeners 202A, 202B to the inner race 56 at location that is disposed radially outwardly from the gear teeth 80 (such as that shown in FIG. 14) or by using any other suitable means.

As shown in FIG. 15, the stiffeners 202A, 202B intersect one another along the interior of the pitch bearing 50. In such an embodiment, the stiffeners 202A, 202B may be configured to be coupled to one another (e.g., using a suitable fastener(s)) at the intersection point. Alternatively, the stiffeners 202A, 202B may be configured to extend across the interior of the pitch bearing 50 without intersecting one another, such as by configuring the stiffeners 202A, 202B to extend parallel to one another.

It should be appreciated that, although two stiffeners 202A, 202B are shown in FIG. 14, any number of stiffeners may be coupled to the inner race 56 so as to extend across the interior of the pitch bearing 50. For instance, in another embodiment, three or more stiffeners may be installed on the pitch bearing 50.

It should also be appreciated that, in alternative embodiments, the stiffener 200 (or stiffeners 202A, 202B) may be configured to be coupled to the inner race 50 via any embodiment of the circumferential flange 100 described above with reference to FIGS. 3-11. Similarly, the ring-shaped stiffener 102 described above may be configured to be coupled to the inner race 50 via the configuration shown in FIG. 13 and/or the configuration shown in FIG. 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch bearing assembly a wind turbine, the pitch bearing assembly comprising:
    an outer race;
    an inner race rotatable relative to the outer race, the inner race defining an inner circumference and including a plurality of gear teeth around the inner circumference, the inner race further including a circumferential flange extending at least partially around the inner circumference, the circumferential flange extending radially inwardly relative to the inner race such that a top surface of the circumferential flange is coplanar with a top surface of the inner race, the top surface of the inner race configured to abut a root end of a rotor blade of the wind turbine when the rotor blade is coupled to the inner race; and
    a stiffener coupled to the circumferential flange,
    wherein the stiffener extends outwardly from the top surface of the circumferential flange such that the stiffener is configured to be received axially within an interior of the rotor blade relative to a plane defined by the root end of the rotor blade.

2. The pitch bearing assembly of claim 1, wherein the circumferential flange is spaced apart axially from a top end of the gear teeth.

3. The pitch bearing assembly of claim 1, wherein the circumferential flange is ring-shaped and extends around the entire inner circumference of the inner race.

4. The pitch bearing assembly of claim 1, wherein the circumferential flange is formed from a plurality of flange segments spaced apart circumferentially around the inner circumference of the inner race.

5. The pitch bearing assembly of claim 1, wherein the stiffener includes a ring-shaped mounting flange and a stiffening web extending within the mounting flange.

6. The pitch bearing assembly of claim 5, wherein the stiffening web defines a planar profile or a non-planar profile.

7. The pitch bearing assembly of claim 6, wherein the stiffening web is formed from at least one stiffening arm, the stiffening arm including a first radially extending portion and a second radially extending portion spaced apart axially from the first radially extending portion.

8. The pitch bearing assembly of claim 5, wherein the stiffening web defines a solid cross-sectional profile or a non-solid cross-sectional profile.

9. The pitch bearing assembly of claim 1, wherein the circumferential flange includes a first flange segment and a second flange segment, the stiffener being coupled between the first and second flange segments.

10. The pitch bearing assembly of claim 1, wherein the circumferential flange is separate and spaced apart from the gear teeth along the inner circumference of the inner race.

11. A rotor blade assembly for a wind turbine, comprising:
a rotor blade including a body extending between a blade root and a blade tip, the blade root including a root end defining a plane;
a pitch bearing coupled to the blade root, the pitch bearing including an outer race and an inner race rotatable relative to the outer race, the inner race defining an inner circumference and including a plurality of gear teeth around the inner circumference, the inner race further including an integrally formed circumferential flange extending at least partially around the inner circumference, the circumferential flange extending radially inwardly relative to the inner race such that a top surface of the circumferential flange is coplanar with a top surface of the inner race, the top surface of the inner race configured to abut the root end of the blade root; and
a stiffener coupled to the circumferential flange,
wherein the stiffener extends outwardly from the top surface of the circumferential flange such that the stiffener is received axially within an interior of the rotor blade relative to the plane defined by the root end of the rotor blade.

12. The rotor blade assembly of claim 11, wherein the circumferential flange is spaced apart axially from the gear teeth.

13. The rotor blade assembly of claim 11, wherein the circumferential flange is separate and spaced apart from the gear teeth along the inner circumference of the inner race.

* * * * *